(12) United States Patent
Sharma et al.

(10) Patent No.: US 6,813,275 B1
(45) Date of Patent: Nov. 2, 2004

(54) METHOD AND APPARATUS FOR PREVENTING UNDERFLOW AND OVERFLOW ACROSS AN ASYNCHRONOUS CHANNEL

(75) Inventors: Debendra Das Sharma, Santa Clara, CA (US); Donald A. Williamson, Cupertino, CA (US); Edward M. Jacobs, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/556,052

(22) Filed: Apr. 21, 2000

(51) Int. Cl.[7] .............................................. H04L 12/56
(52) U.S. Cl. ........................................ 370/412; 710/52
(58) Field of Search ................................ 370/235–237, 370/230, 412–418, 428, 429, 395.7–395.72; 710/52

(56) References Cited

U.S. PATENT DOCUMENTS

| | | | | |
|---|---|---|---|---|
| 4,692,894 A | * | 9/1987 | Bemis .......................... | 710/57 |
| 4,965,793 A | * | 10/1990 | Polzin et al. ................ | 370/236 |
| 5,539,747 A | * | 7/1996 | Ito et al. ...................... | 370/235 |
| 5,852,601 A | * | 12/1998 | Newman et al. ............. | 370/230 |
| 6,026,075 A | * | 2/2000 | Linville et al. .............. | 370/236 |
| 6,169,727 B1 | * | 1/2001 | Song ............................ | 370/235 |
| 6,189,035 B1 | * | 2/2001 | Lockhart et al. ............ | 709/229 |
| 6,304,552 B1 | * | 10/2001 | Chapman et al. ........... | 370/232 |
| 6,456,399 B1 | * | 9/2002 | Ho et al. ..................... | 358/404 |
| 6,477,143 B1 | * | 11/2002 | Ginossar ...................... | 370/230 |
| 6,600,721 B2 | * | 7/2003 | Edholm ....................... | 370/232 |

FOREIGN PATENT DOCUMENTS

| | | |
|---|---|---|
| EP | 0757503 A2 | 2/1997 |
| GB | 2307139 A | 5/1997 |

* cited by examiner

Primary Examiner—Ajit Patel (57) ABSTRACT

An apparatus and method for an improved asynchronous communication channel between a transmitter and a receiver having separate clocks. The invention provides a simple implementation that solves both the overflow and the underflow problem using the same mechanism, and reduces complexity by elimination of the control split between the two clock domains. A first embodiment of the invention is a method for preventing packet underflow and packet overflow for packets sent across an asynchronous link between a transmitter and a receiver, including a buffer that can store a number of packets greater than an ideal number of packets. The method includes sending a predetermined number of drop-me warning packets and sending one or more drop-me packets from the transmitter to the receiver, receiving the predetermined number of drop-me warning packets and the one or more drop-me packets in the buffer, compensating for packet overflow when the number of packets is greater than the ideal number of packets in the buffer by skipping at least one drop-me packet, and compensating for packet underflow in the buffer when the number of packets is less than the ideal number of packets by stalling access to the buffer for one or more clock cycles. A second embodiment of the invention is an asynchronous link for packets sent between a transmitter having a first clock and a receiver having a second clock, including a buffer to receive the first clock from the transmitter and receive from the transmitter a number of packets equal to or different to a predetermined ideal number of packets, a write pointer, and a read pointer, and a read pointer control circuit to change the read pointer, wherein the buffer can receive drop-me packets, and the read pointer can skip a drop-me packet in the buffer.

23 Claims, 9 Drawing Sheets

| HEADER PACKET | | |
|---|---|---|
| ECC Check Bits | Other Bits | Type Bits |
| 71      64 | 63                                              5 | 4      0 |

| DATA PACKET | |
|---|---|
| ECC Check Bits | Data Bits |
| 71      64 | 63                                                              0 |

METHOD AND APPARATUS FOR PREVENTING UNDERFLOW AND OVERFLOW ACROSS AN ASYNCHRONOUS CHANNEL

BACKGROUND OF THE INVENTION

1. Field of the Invention

This invention relates generally to an improvement in asynchronous communication, and more specifically to preventing packet underflow and overflow without undue circuit complexity.

2. Description of the Prior Art

In a system with multiple integrated circuit (IC) chips operating at different core frequencies, if the transmitting chip clock frequency is different from the receiving chip clock frequency, there may be packet overflow or underflow problems. A packet overflow problem occurs when the transmitting chip clock frequency is higher than the receiving chip clock frequency, and some packets are dropped at the receiving chip. A packet underflow problem occurs when the transmitting chip clock frequency is lower than the receiving chip clock frequency, and the receiving chip has some clock cycles when there are no valid data packets from the transmitting chip. These packet underflow episodes are sometimes referred to as bubbles.

One prior art solution involves performing the packet processing (namely error correction code decoding, type decoding, initialization, and other basic functions) on the receiving chip side using the clock of the transmitting chip. This requires a significant amount of circuitry in the receiving chip that is controlled by the transmitting chip's clock. One drawback of this prior art approach is that the control circuitry gets split between the two clock domains, making the design complex, since the two clock domains have to work together in tandem. It also means that some control and status registers, including error-logging registers, need to be present in the transmitting chip clock domain.

Figure 1:
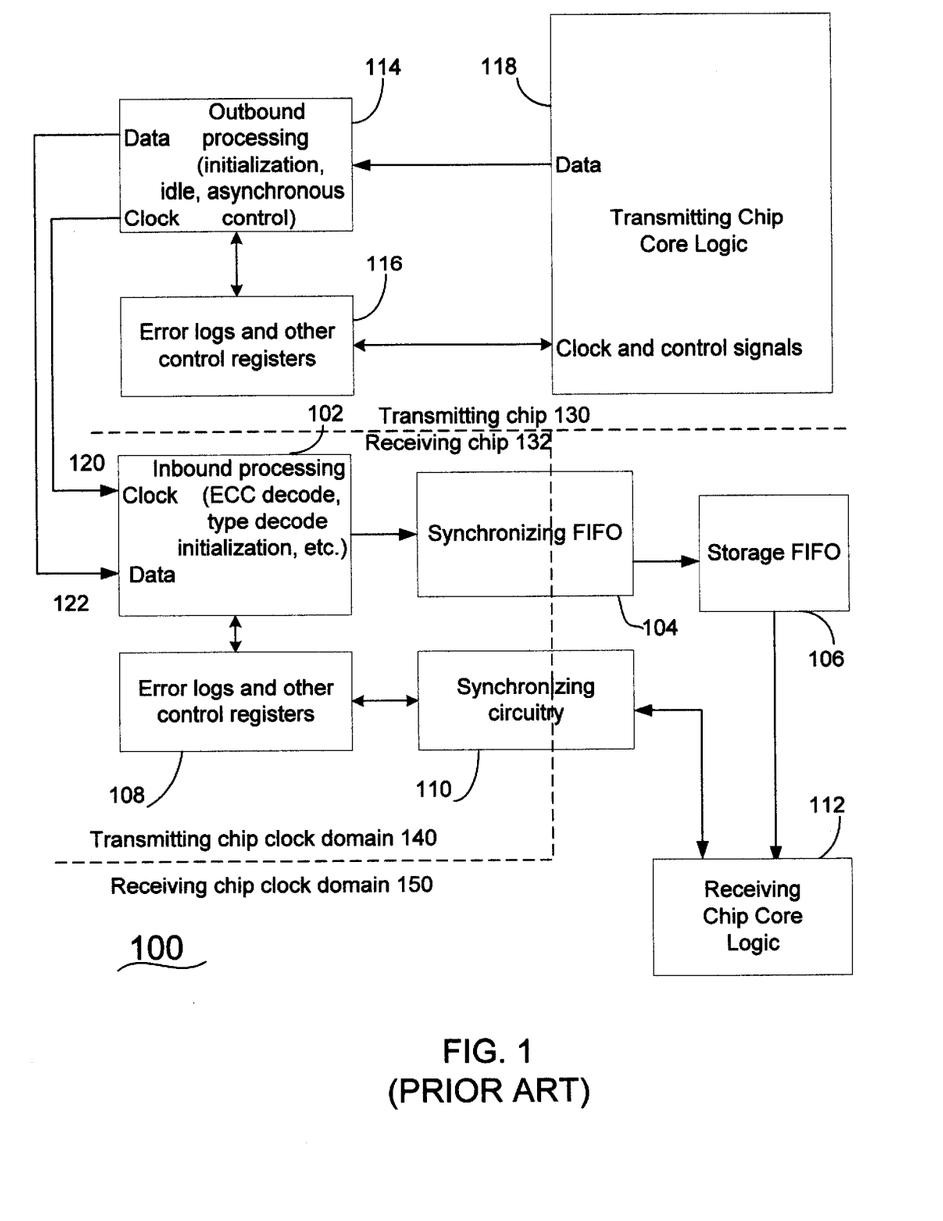
FIG. 1 illustrates a prior art approach for transmission and reception of packets between two chips.

FIG. 1 illustrates a prior art approach for transmission and reception of packets between a transmitting chip 130 and a receiving chip 132. Transmitting chip core logic 118 sends data signals to outbound processing circuit 114, and sends and receives clock and control signals from error logs and other control registers 116. In the transmitting chip clock domain 140, inbound processing circuit 102 receives transmitting chip clock 120 and data 122 from outbound processing circuit 114, and provides packets to a synchronizing First-In-First-Out (FIFO) buffer 104, which is read using a receiving chip clock (not shown) and written using the transmitting chip clock 120. Storage FIFO 106 is entirely in the receiving chip clock domain 150 and receives packets from synchronizing FIFO 104. Error logs and other control registers 108 send and receive signals from inbound processing circuit 102, and send and receive signals from synchronizing circuitry 110. Synchronizing circuitry 110 is used to access these error logs and other control registers 108 from the receiving chip clock domain 150. Receiving chip core logic 112 sends and receives signals from synchronizing circuitry 110, and receives data from storage FIFO 106.

This prior art approach handles the packet underflow problem by ensuring that an adequate number of packets in the transaction are gathered by the storage FIFO 106 before sending the transaction to the receiving chip core logic 112. A packet overflow problem is handled by ensuring that the transmitting chip 130 sends a number of idle packets at fixed intervals of time, so that the receiving chip 132 can catch up without requiring the idle packets to go through its synchronizing FIFO buffer 104 into the receiving chip clock domain 150.

For example, a prior art approach for handling the packet overflow problem would set up the transmitting chip 130 to send three or more idle packets every 1000 clock cycles, regardless of whether or not these 1000 clock cycle intervals occur in the middle of a transaction. Furthermore, the prior art approach for handling the packet underflow problem would require a hardware and software mechanism to stop pulling out packet entries from the storage FIFO buffer until a certain number of packet entries are available. Therefore, prior art solutions for overflow and underflow packet problems require separate hardware and software for overflow and underflow, with hardware in the packet path both before and after the synchronizing FIFO buffer, and require substantially continuous processing of the packets with this hardware and software, even in the middle of transactions.

There are several drawbacks to this prior art approach. There is a lot of extra circuitry required to synchronize the registers in the transmitting chip clock domain 140 to the receiving chip clock domain 150. This extra circuitry introduces greater complexity into the design. This approach also makes parts of the circuitry, such as the status and control registers in the transmitting chip clock domain 140 inaccessible, when the transmitting chip 130 is not present, has not been powered on, or is in some kind of reset state. The system software has to operate successfully despite these possibilities; this can require very complex software that is difficult to write and difficult to debug. This is also not a good solution from a high reliability/availability perspective, since the transmitting chip 130 not only affects the link to which the receiving chip 132 is connected, it also affects parts of the receiving chip 132, rendering these parts inaccessible.

One way to get around the latency problem is to design a core in the receiving chip 132 that can deal with bubbles caused by packet underflow. However, this will significantly complicate the design. In addition, increasing design complexity of a system (and the number of components that can fail) generally reduces the overall reliability of the system.

What is needed is a simple implementation that solves both the packet overflow problem and the packet underflow problem using the same mechanism, and which reduces the complexity of the solution by elimination of the control split between the receiving chip and transmitting chip clock domains.

SUMMARY OF THE INVENTION

One object of the invention is to provide a simple implementation that solves both the overflow problem and the underflow problem using the same mechanism, and which reduces the solution complexity by elimination of the control split between the receiving chip and transmitting chip clock domains.

A first aspect of the invention is directed to a method for preventing packet underflow and packet overflow for packets sent across an asynchronous link between a transmitter and a receiver, wherein the receiver includes a buffer that can store a number of packets greater than an ideal number of packets. The method includes sending a predetermined number of drop-me warning packets from the transmitter to the receiver across the asynchronous link, sending one or more drop-me packets from the transmitter to the receiver across the asynchronous link, receiving the predetermined number of drop-me warning packets and the one or more drop-me packets in the buffer, compensating for packet overflow when the number of packets in the buffer is greater than the ideal number of packets by skipping at least one drop-me packet in the buffer, so that the ideal number of packets is substantially maintained in the buffer, and compensating for packet underflow when the number of packets is less than the ideal number of packets by stalling access to the buffer for one or more clock cycles, so that the ideal number of packets is substantially maintained in the buffer.

A second aspect of the invention is directed to an asynchronous link for packets sent between a transmitter having a first clock and a receiver having a second clock. The asynchronous link includes a buffer to receive the first clock from the transmitter and receive from the transmitter a number of packets equal to or different from a predetermined ideal number of packets, a read pointer containing a read address for the buffer and a read pointer control circuit to change the read address, wherein the buffer can receive drop-me packets and the read address in the read pointer can skip a drop-me packet in the buffer, and a write pointer containing a write address for the buffer.

These and other objects and advantages of the invention will become apparent to those skilled in the art from the following detailed description of the invention and the accompanying drawings.

DETAILED DESCRIPTION OF PREFERRED EMBODIMENTS OF THE INVENTION

This invention provides an improved method and apparatus for asynchronous communication between a transmitting chip and a receiving chip with different core clock frequencies.

In one preferred embodiment of the invention, a transaction is made up of one header packet by itself, or a header packet followed by or one or more data packets. The packets in a transaction are sent on consecutive clock cycles. A special type of header packet known as an idle packet is sent if there are no transactions available to be sent.

This preferred embodiment of the invention also includes a special synchronizing sequence, which is made up of two new types of header packets. The first of the new header packet types is called a drop-me warning packet. The second of the new header packet types is called a drop-me packet. The synchronizing sequence consists of a series of drop-me warning packets followed by a series of drop-me packets. The transmitting chip periodically sends a synchronizing sequence between transactions.

Figure 2A:
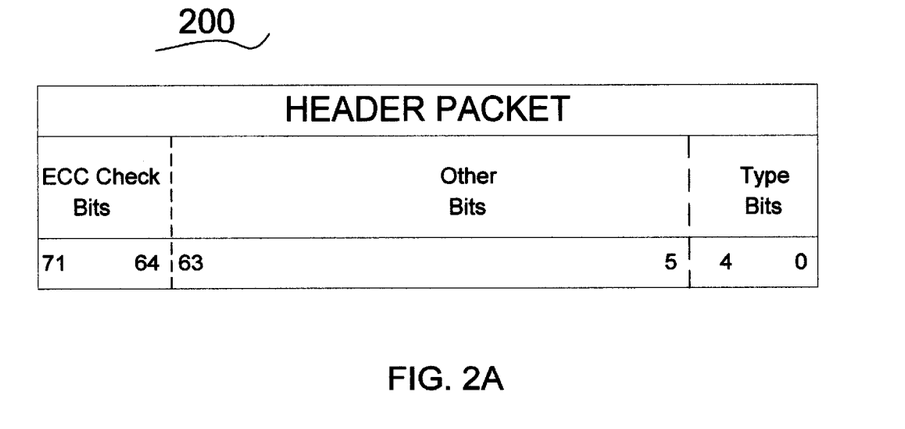
FIG. 2A shows a 72-bit header packet, with eight bits for ECC checking, and five bits for encoding the type of packet.

FIG. 2A shows a 72-bit header packet 200, with eight bits for ECC checking (bits 71 to 64), and five bits for encoding the type of packet (bits 4 to 0). Five bits is sufficient to encode 32 types, including idle packets, drop-me warning packets, drop-me packets, and header packets for a variety of transaction types. Typically, a five-bit field is sufficient, because there are approximately twenty types of transactions in typical applications. This encoded type field also indicates to the receiving chip the number of data packets, which follow the header packet to form the current transaction. The header packet preferably includes other bit fields identifying the source and destination of the transaction (bits 63 to 5).

Figure 2B:
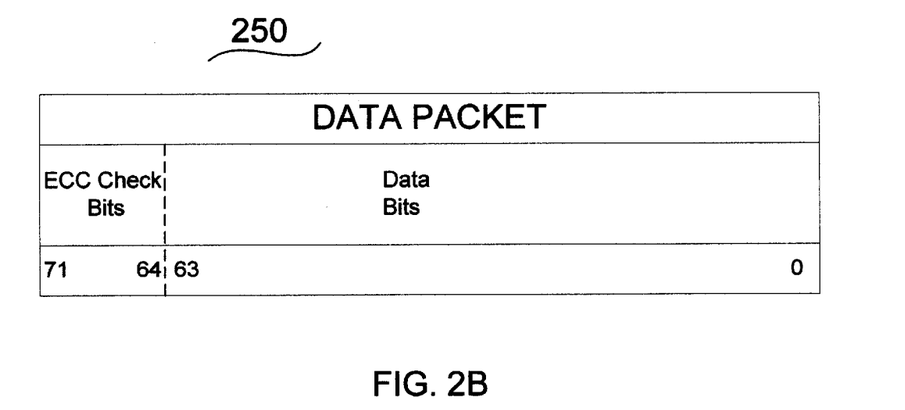
FIG. 2B shows a 72-bit data packet, with eight bits for ECC checking, and the remaining 64 bits available for data bits.

FIG. 2B shows a 72-bit data packet 250, with eight bits for ECC checking (bits 71 to 64), and the remaining 64 bits available for data bits (bits 63 to 0). A packet typically ranges from 32 to 144 bits, and preferably ranges from 64 to 72 bits, but a packet could have more or less bits, depending on the type of transaction that is divided into packets.

Figure 3:
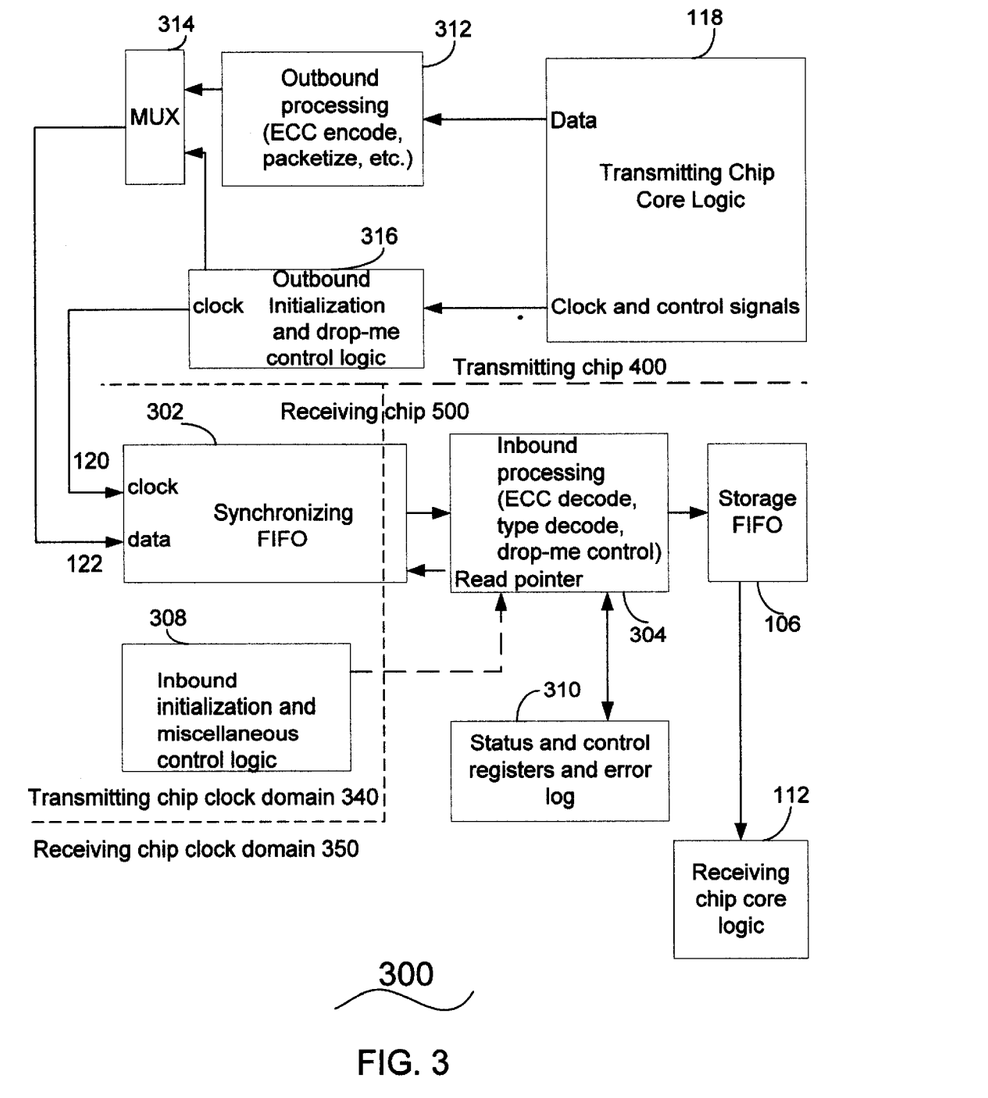
FIG. 3 illustrates an overview of one preferred embodiment of the invention.

FIG. 3 illustrates an overview of one preferred embodiment of the invention in which a transmitting chip 400 is connected to a receiving chip 500. Transmitting chip core logic 118 provides data signals to outbound processing circuit 312, and clock and control signals to outbound initialization and drop-me control logic 316. Both outbound processing circuit 312 and outbound initialization and drop-me control logic 316 provide data inputs to multiplexer MUX 314. Synchronizing First-In-First-Out (FIFO) buffer 302 receives data signal 122 from the output of multiplexer MUX 314, and receives transmitting chip clock signal 120 from outbound initialization and drop-me control logic 316. Synchronizing FIFO buffer 302 and inbound initialization and miscellaneous control logic 308 are the receiving chip components subject to the transmitting chip clock domain 340. Synchronizing FIFO buffer 302 includes a storage portion, and a write pointer. A read pointer for synchronizing FIFO buffer 302 is found in inbound processing circuit 304 in the receiving chip clock domain 350. The inbound processing circuit 304 sends and receives signals from status and control registers and error log 310, and sends received packets to storage FIFO 106. Receiving chip core logic 112 reads the packets stored in storage FIFO 106.

Figure 4:
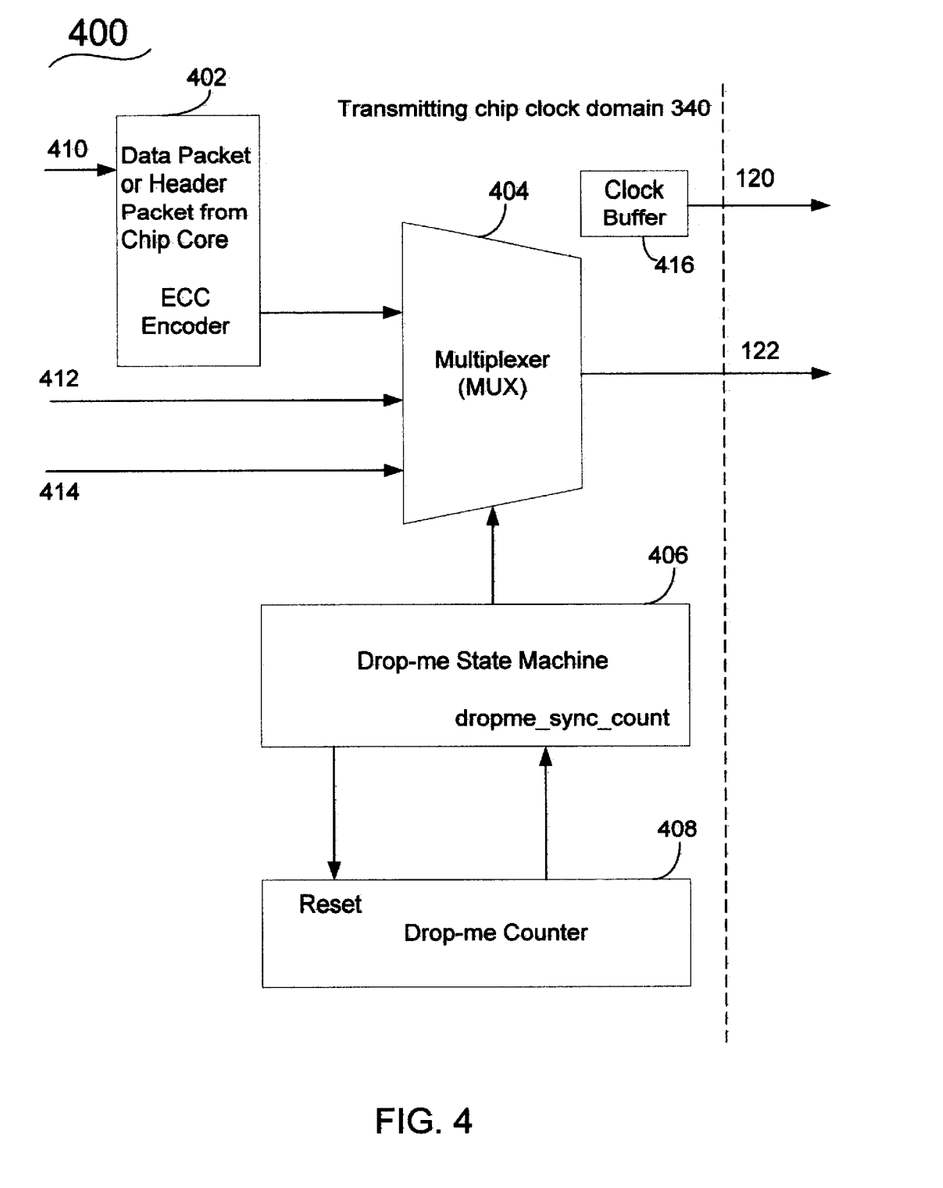
FIG. 4 shows a transmitting chip in accordance with one preferred embodiment of the invention.

FIG. 4 shows a transmitting chip 400 in accordance with one preferred embodiment of the invention. Transmitting chip 400 comprises an ECC encoder 402, which provides packets 410 from the core of the transmitting chip to multiplexer MUX 404. Multiplexer MUX 404 also receives drop-me packets 412 and drop-me warning packets 414 to be selectively provided on the data output 122 of MUX 404 to be sent to the receiving chip 500 (shown in FIG. 5), in conjunction with transmitting chip clock 120 provided by clock buffer 416. MUX 404 is controlled by drop-me state machine 406, which sends a reset signal to drop-me counter 408, and receives a dropme_sync_count signal from drop-me counter 408.

Figure 5:
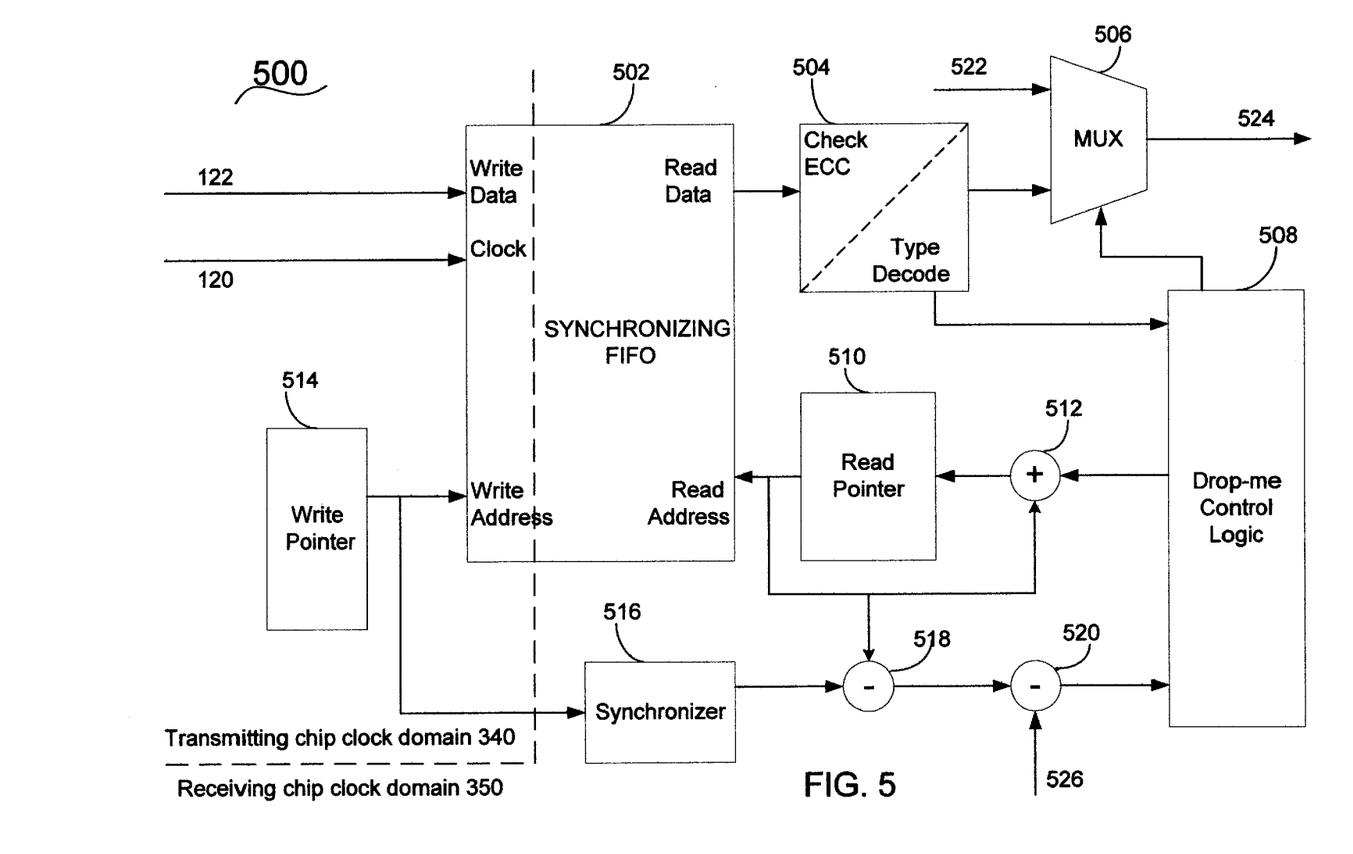
FIG. 5 shows a receiving chip in accordance with one preferred embodiment of the invention.

FIG. 5 shows a receiving chip 500 in accordance with one preferred embodiment of the invention. Receiving chip 500 comprises a synchronizing FIFO buffer 502, processing circuitry 504 to check ECC and perform type decode, multiplexer MUX 506, drop-me control logic 508, read pointer circuitry 510, write pointer circuitry 514, and synchronizer 516. Synchronizing FIFO buffer 502 receives data signals 122 and clock 120 from the transmitting chip 400 (shown in FIG. 4), provides read data output to processing circuitry 504, receives a read address from read pointer circuitry 510, and receives a write address from write pointer circuitry 514. Write pointer circuitry 514 also provides an input signal to synchronizer 516. The read address output of read pointer circuitry 510 is subtracted from the output of synchronizer 516 at subtractor 518. The output of subtractor 518 provides the number of entries in the synchronizing FIFO buffer 502, which is an input to subtractor 520, which subtracts the ideal number of entries, signal 526, from this input. The output of subtractor 520 is coupled to drop-me control logic 508. Adder 512 adds an increment amount from drop-me control logic 508 to the value of the read pointer 510, and sends the incremented value back to the read pointer 510. Drop-me control logic 508 also receives a type decode output from processing circuitry 504, and provides a control input signal to multiplexer MUX 506. This control input signal selects either an idle packet on signal 522 or the packet output of processing circuitry 504 to be output as signal 524 to the core (not shown) of receiving chip 500.

This embodiment of the invention relies on the transmitting chip 400 sending a synchronizing sequence, which is made up of a predetermined number (which can be programmable) of drop-me warning packets, followed by a predetermined number (which can be programmable) of drop-me packets. Typically, the synchronizing sequence indicates that a transaction is completed and that a fixed number of transmitting chip 400 clock cycles have passed since the last synchronizing sequence.

When the receiving chip 500 receives a drop-me warning packet, the receiving chip 500 determines that the transmitting chip is indicating it is time for the receiving chip 500 to compensate for any clock frequency mismatches. The drop-me control 508 in the receiving chip clock domain 350 keeps a certain number of entries in the synchronizing FIFO buffer 502. This is known as the ideal number of entries that will be maintained in the synchronizing FIFO buffer 502. After initialization, processing block 504 starts pulling entries out of the synchronizing FIFO buffer 502 when it sees the ideal number of entries. If the transmitting chip 400 and receiving chip 500 clock frequencies are identical, this ideal number of entries will be in the synchronizing FIFO buffer 502 when the synchronizing sequence is received. In this case, the processing circuitry 504 keeps consuming entries from the synchronizing FIFO buffer in normal operation.

However, if the transmitting chip 400 clock frequency is slower than the receiving chip 500 clock frequency, then there can be less than the ideal number of entries, because the receiving chip 500 is consuming at a faster pace than the transmitting chip 400 is sending. In this case, the processing block will stop consuming entries from the synchronizing FIFO buffer 502 for the number of cycles that correspond to the number of entries not received, so that the ideal number of entries in the synchronizing FIFO buffer 502 will be maintained. When the consumption of entries from the synchronizing FIFO buffer 502 is stopped, idle packets can be artificially injected, if the downstream core logic expects something to be given to it in every clock cycle. Drop-me packets and drop-me warning packets are treated as idle packets.

If the transmitting chip 400 clock frequency is higher than the receiving chip 500 clock frequency, then the number of entries in the synchronizing FIFO buffer 502 can be in excess of the ideal number of entries. In this case, advancing the read pointer of the synchronizing FIFO buffer 502 skips the excess number of entries, so that the ideal number of entries is maintained.

The number of drop-me warning packets in every synchronizing sequence depends on the latency between the reading of the synchronizing FIFO buffer 502, and drop-me control logic 508 taking action to modify or freeze the read pointer. This delay is known as the drop-me processing delay. For example, if it takes two cycles after pulling the first drop-me warning packet for the drop-me control logic 508 to modify its read pointer due to pipelining in the processing unit, then the drop-me processing delay is two receiving chip 500 clock cycles. In this case, three drop-me warning packets followed by the first drop-me packet will be needed. Then it can be assumed that the drop-me control logic 508 will have enough time to act when the first drop-me packet is about to go out. The number of drop-me packets is a design choice. A larger number of drop-me packets will require that the synchronizing sequence will be needed less frequently, since more catch-up is available in each synchronizing sequence. However, this also means that the size of the synchronizing FIFO buffer 502 will need to be increased by an equivalent number of entries, since a higher tolerance for overflows and underflows is needed. The design choice will depend on the intended frequency of operation, the fraction by which the two clocks can deviate, the latencies in the processing unit, the latency from the core of transmitting chip 400 to the core of receiving chip 500, and the maximum length of a transaction in terms of packets.

In the most preferred embodiment of the invention, the synchronizing sequence in every period should be contiguous and can be initiated only on a transaction boundary, and the transmitting chip 400 has to wait for the end of the current transaction before it can start sending the synchronizing sequence. The drop-me counter starts counting the cycles of the next period, even though the transmitting chip 400 waits to send the synchronizing sequence. As soon as the current transaction ends, the transmitting chip 400 starts the synchronizing sequence. The synchronizing FIFO buffer 502 should be designed to handle the case when the synchronizing sequence may be delayed by the longest transaction (i.e., the maximum number of packets). In general, it is a good idea to add a few entries to the number of packets derived mathematically for the size of the synchronizing FIFO buffer 502 as a safe design practice. Since the synchronizing sequence is sent in between transactions, there will not be packet overflow or underflow correction in the middle of a transaction.

For example, a synchronizing sequence consisting of a contiguous group of three drop-me warning packets and three drop-me packets could be sent by the transmitting chip 400 approximately every 1500 clock cycles in a window of time that begins after the end of one transaction and before the beginning of a new transaction. As a specific example, if the transaction straddling the 1500 clock cycle mark consists of a header packet and four data packets, and the fourth data packet happens to be sent on clock cycle 1502, then the first drop-me warning packet would be sent on clock cycle 1503, the second drop-me warning packet would be sent on clock cycle 1504, and so forth. This process of using the transmitting chip 400 to send synchronizing sequences would then be repeated every 1500 transmitting chip clock cycles. And if it happens that the transaction just before clock cycle 1500 sends the last data packet on clock cycle 1499, then the first drop-me warning packet would be sent on clock cycle 1500, and so forth.

Figure 6:
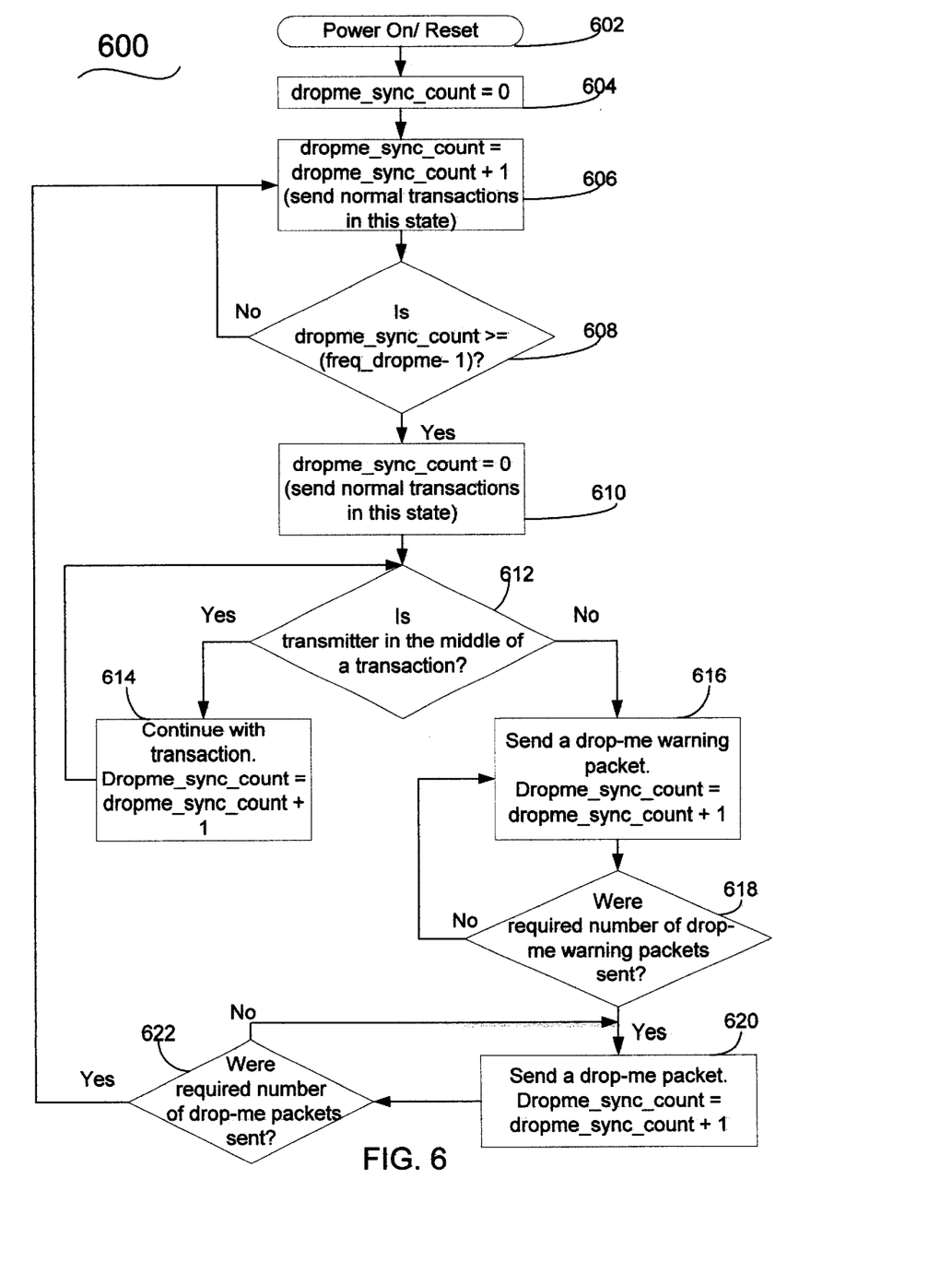
FIG. 6 illustrates a flow chart of a method used by a transmitting chip, which employs both drop-me warning packets and drop-me packets sent by the transmitting chip, in accordance with one embodiment of the invention.

FIG. 6 illustrates a flow chart of a method used by a transmitting chip 400, which employs both drop-me warning packets and drop-me packets sent by the transmitting chip 400, in accordance with one embodiment of the invention. In operation 602, a power on reset state or reset state is entered. In operation 604, dropme_sync_count, a variable to determine when the transmitting chip 400 should start sending a synchronizing sequence, is initialized to zero. In operation 606, the value of dropme_sync_count is incremented by one. In operation 608, the value of dropme_sync_count is compared to the value of FREQ_DROPME−1, a predetermined number of clock cycles that must occur before the transmitting chip 400 should start sending the synchronizing sequence. If the value of dropme_sync_count is less than the value of FREQ_DROPME−1, then it is not yet time and operation 606 is repeated. If the value of dropme_sync_count is greater than or equal to the value of FREQ_DROPME−1, then it is time and operation 610 is next. In operation 610, dropme_sync_count is set to zero. In operation 612, a test is made to determine if the transmitting chip 400 is in the middle of a transaction. If it is in the middle of a transaction, then operation 614 is next, the value of dropme_sync_count is incremented by one, and operation 612 is repeated. If it is not in the middle of a transaction, operation 616 is next, where a drop-me warning packet is sent, and the value of dropme_sync_count is incremented by one. In operation 618, there is a test to determine if the required number of drop-me warning packets was sent. If the required number was not sent, then operation 616 is repeated. If the required number was sent, then operation 620 is next, where a drop-me packet is sent and the value of dropme_sync_count is incremented. In operation 622, a test determines if the required number of drop-me packets was sent. If the required number was sent, the method is done and operation 606 is next. If the required number was not sent, then operation 620 is repeated.

Figure 7:
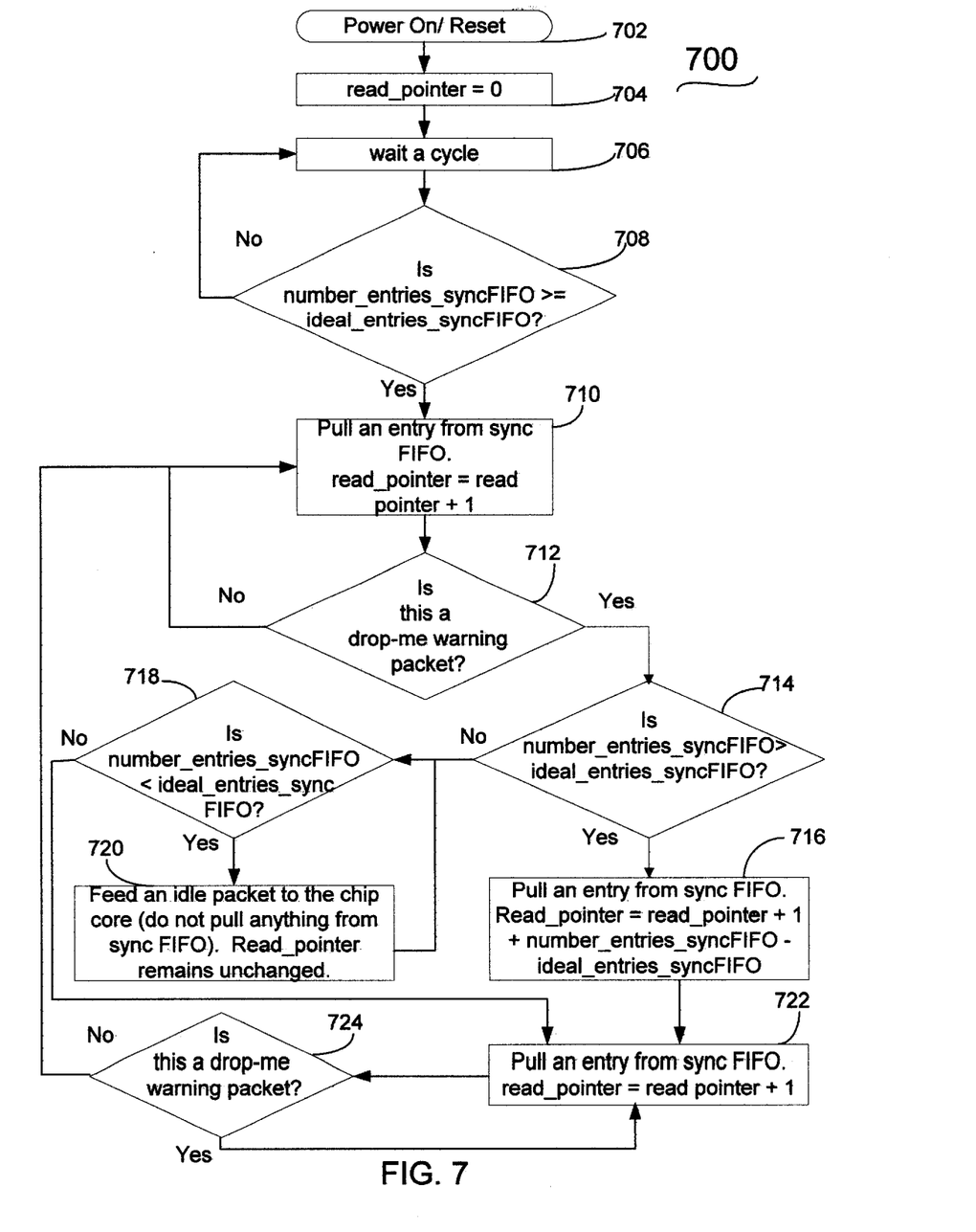
FIG. 7 illustrates a flow chart of a method used by a receiving chip, which employs both drop-me warning packets and drop-me packets received by the receiving chip, in accordance with one embodiment of the invention.

FIG. 7 illustrates a flow chart of a method used by a receiving chip 500, which employs both drop-me warning packets and drop-me packets received by the receiving chip 500, in accordance with one embodiment of the invention. In operation 702, a power on reset state or reset state is entered. In operation 704, read_pointer, a synchronizing FIFO buffer read address variable, is initialized to zero. In operation 706, the receiving chip 500 waits for one clock cycle. In operation 708, the value of number_entries_syncFIFO, a variable that equals the synchronized address in the write pointer minus the address in the read pointer, is compared to the value of ideal_entries_syncFIFO, a predetermined ideal number of packets in the synchronizing FIFO buffer. If the value of number_entries_syncFIFO is less than the value of ideal_entries_syncFIFO, then operation 706 is repeated to wait another cycle. If the value of number_entries_syncFIFO is greater than or equal to the value of ideal_entries_syncFIFO, then operation 710 is next. In operation 710, a packet entry is pulled from the synchronizing FIFO and the address in the read_pointer is incremented. In operation 712, a test is made to determine if this is a drop-me warning packet. If it is not a drop-me warning packet, then operation 710 is repeated. If it is a drop-me warning packet, operation 714 is next, where the value of number_entries_syncFIFO is compared to the value of ideal_entries_syncFIFO. An error will be logged in an error log if the value of number_entries_syncFIFO−ideal_entries_syncFIFO exceeds the tolerated range of deviation from ideal, i.e., the number of drop-me packets in a synchronizing sequence. If the value of number_entries_syncFIFO is greater than the value of ideal_entries_syncFIFO, then operation 716 is next, where a packet entry is pulled from the synchronizing FIFO, the address in read_pointer is incremented by one, plus the value of number_entries_syncFIFO, minus the value of ideal_entries_syncFIFO. Then operation 722 is next. In operation 714, if the value of number_entries_syncFIFO is less than or equal to the value of ideal_entries_syncFIFO, then operation 718 is next. In operation 718, there is a test to determine if the value of number_entries_syncFIFO is less than the value of ideal_entries_syncFIFO. If the value of number_entries_syncFIFO is not less than the value of ideal_entries_syncFIFO, then operation 722 is next. If the value of number_entries_syncFIFO is less than the value of ideal_entries_syncFIFO, then operation 720 is next. In operation 720, an idle packet is fed to the core of receiving chip 500, without pulling any packet from the synchronizing FIFO, and the test of operation 718 is repeated. In operation 722, a packet entry is pulled from the synchronizing FIFO and the address in the read_pointer is incremented. The next operation is operation 724, in which a test is made to determine if this is a drop-me warning packet. If it is not a drop-me warning packet, then operation 710 is next. If it is a drop-me warning packet, operation 722 is repeated.

The preceding method described the use of a synchronizing sequence, which consists of drop-me warning packets and drop-me packets. An alternate embodiment would use only drop-me packets, where the first drop-me packet would be interpreted as a drop-me warning packet. Subsequent drop-me packets would be treated as described above.

Figure 8:
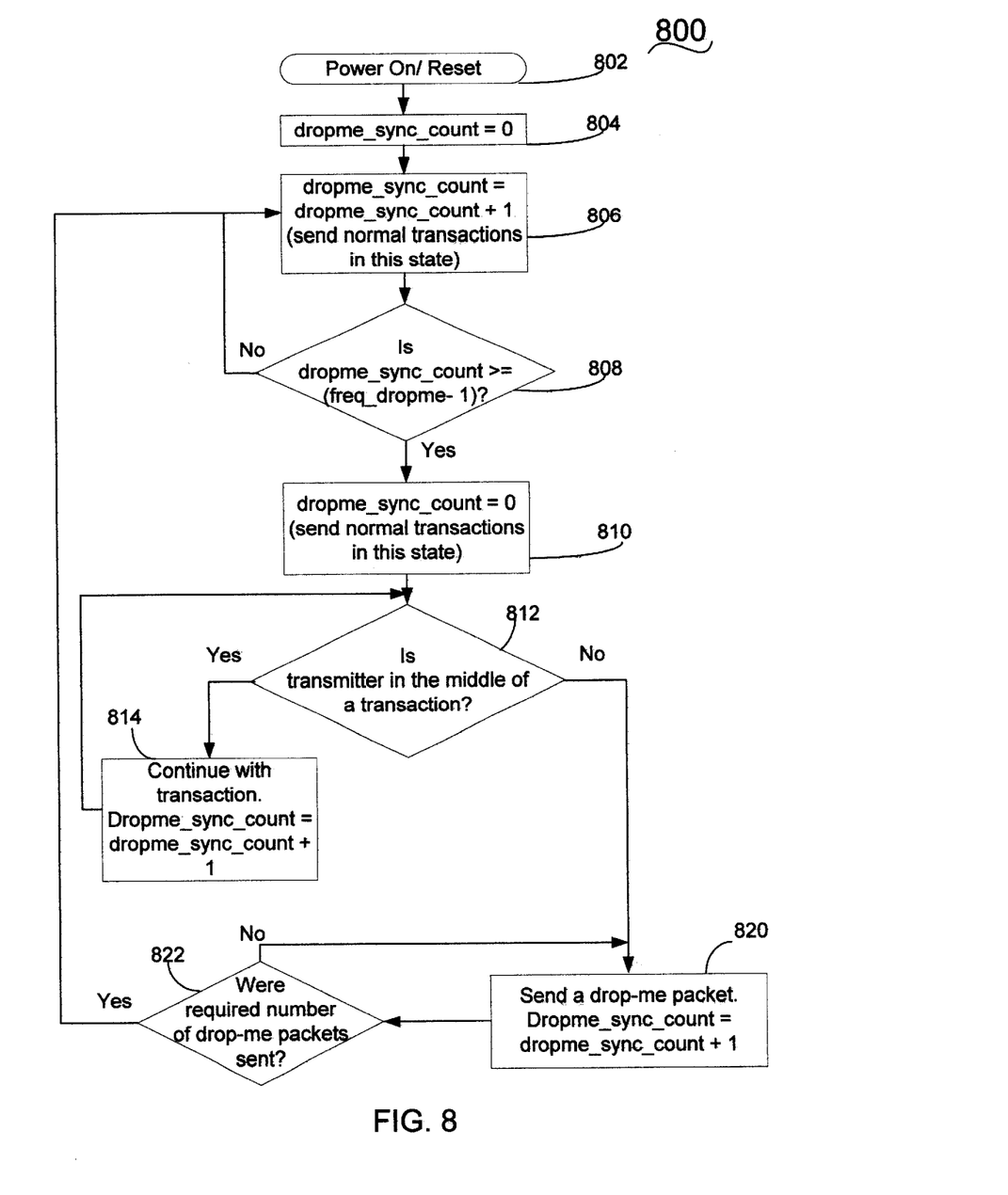
FIG. 8 illustrates a flow chart of a method used by a transmitting chip, which employs only drop-me packets sent by the transmitting chip, in accordance with another embodiment of the invention.

FIG. 8 illustrates a flow chart of a method used by a transmitting chip 400, which employs only drop-me packets sent by the transmitting chip 400, in accordance with another embodiment of the invention. In operation 802, a power on reset state or reset state is entered. In operation 804, dropme_sync_count, a variable to determine when the transmitting chip 400 should start sending a synchronizing sequence, is initialized to zero. In operation 806, the value of dropme_sync_count is incremented by one. In operation 808, the value of dropme_sync_count is compared to the value of FREQ_DROPME−1, a predetermined number of clock cycles that must occur before the transmitting chip 400 should start sending a synchronizing sequence. If the value of dropme_sync_count is less than the value of FREQ_DROPME−1, then operation 806 is repeated. If the value of dropme_sync_count is greater than or equal to the value of FREQ_DROPME−1, then operation 810 is next. In operation 810, the value of dropme_sync_count is set to zero. In operation 812, a test is made to determine if the transmitting chip 400 is in the middle of a transaction. If it is in the middle of a transaction, then operation 814 is next, the value of dropme_sync_count is incremented by one, and operation 812 is repeated. If it is not in the middle of a transaction, operation 820 is next, where a drop-me packet is sent and the value of dropme_sync_count is incremented. In operation 822, a test determines if the required number of drop-me packets was sent. If the required number was sent, the method is done, and operation 806 is next. If the required number was not sent, then operation 820 is repeated.

Figure 9:
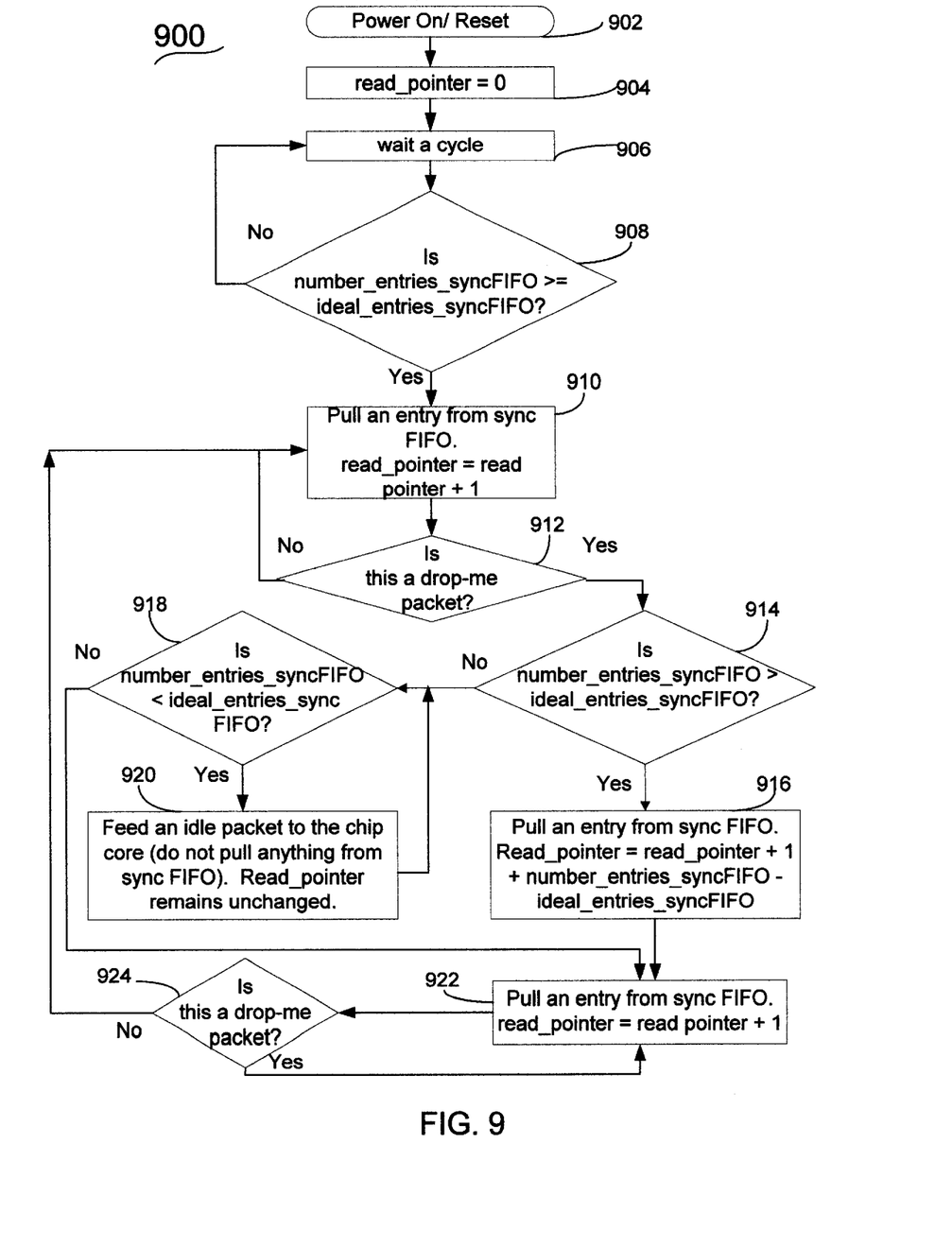
FIG. 9 illustrates a flow chart of a method used by a receiving chip, which employs only drop-me packets received by the receiving chip, in accordance with another embodiment of the invention.

FIG. 9 illustrates a flow chart of a method used by receiving chip 500, which employs only drop-me packets received by receiving chip 500, in accordance with another embodiment of the invention. In operation 902, a power on reset state or reset state is entered. In operation 904, read_pointer, a synchronizing FIFO buffer read address variable, is initialized to zero. In operation 906, the receiving chip 500 waits for one clock cycle. In operation 908, the value of number_entries_syncFIFO, a variable that equals the synchronized address in the write pointer minus the address in the read pointer, is compared to the value of ideal_entries_syncFIFO, a predetermined ideal number of packets in the synchronizing FIFO buffer. If the value of number_entries_syncFIFO is less than the value of ideal_entries_syncFIFO, then operation 906 is repeated to wait another cycle. If the value of number_entries_syncFIFO is greater than or equal to the value of ideal_entries_syncFIFO, then operation 910 is next. In operation 910, a packet entry is pulled from the synchronizing FIFO and the address in read_pointer is incremented. In operation 912, a test is made to determine if this is a drop-me packet. If it is not a drop-me packet, then operation 910 is repeated. If it is a drop-me packet, operation 914 is next, where the value of number_entries_syncFIFO is compared to the value of ideal_entries_syncFIFO. An error will be logged in an error log if the value of number_entries_syncFIFO−ideal_entries_syncFIFO exceeds the tolerated range of deviation from ideal, i.e., the number of dropme packets in a synchronizing sequence minus one, minus the drop-me processing delay described above. If the value of number_entries_syncFIFO is greater than the value of ideal_entries_syncFIFO, then operation 916 is next, where a packet entry is pulled from the synchronizing FIFO, the address in read_pointer is incremented by one and the value of number_entries_syncFIFO, minus the value of ideal_entries_syncFIFO. Then operation 922 is next. In operation 914, if the value of number_entries_syncFIFO is less than or equal to the value of ideal_entries_syncFIFO, then operation 918 is next. In operation 918, there is a test to determine if the value of number_entries_syncFIFO is less than the value of ideal_entries_syncFIFO. If the value of number_entries_syncFIFO is not less than the value of ideal_entries_syncFIFO, then operation 922 is next. If the value of number_entries_syncFIFO is less than the value of ideal_entries_syncFIFO, then operation 920 is next. In operation 920, an idle packet is fed to the core of receiving chip 500, without pulling any packet from the synchronizing FIFO, and the test of operation 918 is repeated. In operation 922, a packet entry is pulled from the synchronizing FIFO and the address in the read_pointer is incremented. The next operation is operation 924, in which a test is made to determine if this is a drop-me packet. If it is not a drop-me packet, then operation 910 is next. If it is a drop-me packet, operation 922 is repeated.

The discussion above has used a single transmitting chip and a single receiving chip as an example of a communication channel. However, alternative embodiments of the invention could be implemented on more than one transmitting chip and more than one receiving chip. Additionally, alternative embodiments could be implemented for communication channels for systems that are not incorporated on individual IC chips.

The most preferred embodiments of the invention use FIFO buffers to implement the synchronizing buffer 502 (shown in FIG. 5). However, alternative embodiments could use other types of memory (e.g., random access memory, programmable memory such as flash memory, magnetic memory, and so forth) to implement the synchronizing buffer 502. Alternative embodiments of the invention could use multiple synchronizing buffers to achieve one or more benefits, such as timing benefits. Furthermore, the preferred embodiments of the invention use a synchronizing sequence consisting of contiguous drop-me warning packets and drop-me packets between transactions. However, alternative embodiments could use alternative sequences of drop-me warning packets and drop-me packets, or only contiguous drop-me packets between transactions.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method for preventing packet underflow and packet overflow for packets sent across an asynchronous link between a transmitter and a receiver, wherein said receiver includes a buffer that can store a number of packets greater than an ideal number of packets, said method comprising:
   determining whether transmission of a first transaction across said asynchronous link is completed;
   sending a predetermined number of drop-me warning packets from said transmitter to said receiver across said asynchronous link upon completing transmission of said first transaction and before transmitting a second transaction across said asynchronous link;
   sending one or more drop-me packets from said transmitter to said receiver across said asynchronous link before transmitting said second transaction across said asynchronous link;
   receiving said predetermined number of drop-me warning packets and said one or more drop-me packets in said buffer in said receiver;
   compensating for said packet overflow when said number of packets in said buffer is greater than said ideal number of packets by skipping at least one drop-me packet in said buffer in said receiver, so that said ideal number of packets is substantially maintained in said buffer; and
   compensating for said packet underflow when said number of packets in said buffer is less than said ideal number of packets by stalling access to said buffer for one or more clock cycles, so that said ideal number of packets is substantially maintained in said buffer.

2. The method of claim 1, wherein said buffer is a synchronizing First-In-First-Out (FIFO) buffer.

3. The method of claim 1, wherein said step of compensating for packet underflow further comprises injecting idle packets in said receiver.

4. The method of claim 1, wherein said predetermined number of drop-me warning packets is zero, and the first drop-me packet of said one or more drop-me packets is treated as a drop-me warning packet.

5. The method of claim 1, wherein said first transaction and said second transaction each comprises a header packet identifying a number of data packets followed by said number of data packets.

6. The method of claim 1, wherein said step of sending drop-me packets further comprises predetermining the number of said one or more drop-me packets sent from said transmitter to said receiver.

7. The method of claim 1, wherein said step of skipping at least one drop-me packet in said buffer in said receiver includes incrementing an address in a read pointer to said buffer.

8. An asynchronous link for packets sent between a transmitter having a first clock and a receiver having a second clock, comprising:

a buffer to receive said first clock from said transmitter and to receive from said transmitter a first number of said packets equal to or different from a predetermined ideal number of packets;

a circuit coupled to said buffer to determine whether transmission of a first transaction across said asynchronous link is completed, said first transaction comprising a header packet identifying a second number of data packets followed by said second number of data packets;

a read pointer containing a read address for said buffer and a read pointer control circuit to change said read address in said read pointer, wherein said buffer can receive from said transmitter a plurality of drop-me packets and said read address in said read pointer can skip at least one drop-me packet in said buffer, wherein said drop-me packets are only received from said transmitter after said transmitter has completed transmitting said first transaction to said receiver and before said transmitter starts transmitting a second transaction across said asynchronous link; and a write pointer containing a write address for said buffer;

said circuit compensating for packet overflow when said first number of packets is greater than said predetermined ideal number of packets by skipping at least one drop-me packet in said buffer in said receiver, said circuit also compensating for packet underflow when said first number of packets is less than said predetermined ideal number of packets by stalling access to said buffer for one or more second clock cycles in said receiver.

9. The asynchronous link of claim 8 wherein said circuit initializes and controls said write address in said write pointer for said buffer.

10. The asynchronous link of claim 8 wherein said circuit synchronizes said write pointer to said second clock.

11. The asynchronous link of claim 8, further comprising a multiplexer to selectively transmit a header packet, a data packet, a drop-me packet, or a drop-me warning packet as an output, said multiplexer being controlled by a plurality of input signals.

12. The asynchronous link of claim 11, further comprising:

a drop-me counter having a reset input and an output value; and a drop-me state machine to provide said reset input to said drop-me counter, and receive said output value from said drop-me counter, said drop-me state machine providing said plurality of input signals to said multiplexer.

13. The asynchronous link of claim 8, wherein said buffer is a synchronizing First-In-First-Out (FIFO) buffer.

14. The asynchronous link of claim 8 wherein said circuit comprises:

an error correction code decoder; and a packet type decoder.

15. The asynchronous link of claim 8 wherein said circuit comprises drop-me packet control logic to change an address in said read pointer by providing an input signal to said read pointer control circuit.

16. A computer with program-controlled circuitry to reduce underflow and overflow of packets sent from a transmitter having a first clock and a receiver having a second clock, comprising:

a buffer to receive a first number of packets and receive said first clock from said transmitter, said buffer also for receiving drop-me packets transmitted from said transmitter, said set of drop-me packets transmitted only upon completing transmission of a first transaction and before beginning to transmit a second transaction, said first and second transactions each comprising a header packet identifying a second number of data packets followed by said second number of data packets;

a circuit coupled to said buffer to determine whether transmission of said first transaction is completed by identifying a packet type;

a read pointer containing a read address for said buffer and a read pointer circuit to change said read address in said read pointer; and a write pointer containing a write address for said buffer;

said circuit compensating for packet overflow when said first number of packets is greater than a predetermined ideal number of packets by skipping at least one drop-me packet in said buffer in said receiver, said circuit also compensating for packet underflow when said first number of packets is less than said predetermined ideal number of packets by stalling access to said buffer for one or more second clock cycles in said receiver, wherein said compensating is performed only upon completing said transmission of said first transaction.

17. The computer of claim 16, further comprising a multiplexer to selectively transmit a header packet, a data packet, a drop-me packet, or a drop-me warning packet as an output, said multiplexer being controlled by a plurality of input signals.

18. The computer of claim 17, further comprising:

a drop-me counter having a reset input and an output value; and a drop-me state machine to provide said reset input to said drop-me counter, and receive said output value from said drop-me counter, said drop-me state machine providing said plurality of input signals to said multiplexer.

19. The computer of claim 16, wherein said buffer is a synchronizing First-In-First-Out (FIFO) buffer.

20. The computer of claim 16 wherein said circuit comprises an error correction decoder to decode a plurality of error correction code bits in said plurality of packets.

21. The computer of claim 16 wherein said circuit comprises:

a type decoder to decode a plurality of command encode bits in said second number of packets; and drop-me packet control logic to change said address in said read pointer by providing an input signal to said read pointer control circuit.

22. The computer of claim 16 wherein said circuit initializes and controls said write pointer for said buffer; and wherein said circuit synchronizes said write pointer to said second clock.

23. The computer of claim 16, further comprising an encoder to encode a plurality of error correction code bits in one or more packets.

* * * * *